(12) United States Patent
Lee et al.

(10) Patent No.: US 10,684,005 B2
(45) Date of Patent: Jun. 16, 2020

(54) CEILING MOUNTABLE LIGHT BOX SYSTEM

(71) Applicant: Bitro Group, Inc., Hackensack, NJ (US)

(72) Inventors: Ki S. Lee, Palisades Park, NJ (US); Nikitas Nicolakis, Astoria, NY (US)

(73) Assignee: Bitro Group, Inc., Hackensack, NJ (US)

( * ) Notice: Subject to any disclaimer, the term of this patent is extended or adjusted under 35 U.S.C. 154(b) by 0 days.

(21) Appl. No.: 16/352,438

(22) Filed: Mar. 13, 2019

(65) Prior Publication Data

US 2019/0285265 A1 Sep. 19, 2019

Related U.S. Application Data

(60) Provisional application No. 62/693,554, filed on Jul. 3, 2018, provisional application No. 62/642,837, filed on Mar. 14, 2018.

(51) Int. Cl.
| | |
|---|---|
| *F21V 31/00* | (2006.01) |
| *F21V 3/00* | (2015.01) |
| *F21V 17/00* | (2006.01) |
| *F21V 8/00* | (2006.01) |
| *F21S 8/04* | (2006.01) |
| *F21V 23/00* | (2015.01) |
| *F21Y 115/10* | (2016.01) |

(52) U.S. Cl.
CPC .............. *F21V 31/005* (2013.01); *F21S 8/04* (2013.01); *F21V 3/00* (2013.01); *F21V 17/002* (2013.01); *F21V 23/009* (2013.01); *G02B 6/0005* (2013.01); *F21Y 2115/10* (2016.08)

(58) Field of Classification Search
CPC .... F21V 31/005; F21V 23/009; F21V 17/002; F21V 3/00; F21V 29/00; F21V 29/002; F21V 29/02; F21V 29/20; F21V 29/40; F21V 29/50; F21S 8/04; F21S 10/06; F21Y 2115/10; F04D 25/088; F04D 29/005; G02B 6/0005; F21K 9/278
See application file for complete search history.

(56) References Cited

U.S. PATENT DOCUMENTS

2016/0102825 A1* 4/2016 Scribante ................ F21S 8/022
362/217.12

* cited by examiner

*Primary Examiner* — Joseph L Williams
*Assistant Examiner* — Jose M Diaz
(74) *Attorney, Agent, or Firm* — Myers Wolin, LLC (57) ABSTRACT

A lighting fixture is provided in which the fixture includes a lighting surface, a lighting fixture frame adjacent an edge of the lighting surface, a sealable compartment within the lighting fixture frame, and a removable cover for sealing the sealable compartment.

24 Claims, 12 Drawing Sheets

CEILING MOUNTABLE LIGHT BOX SYSTEM

CROSS REFERENCES TO RELATED APPLICATIONS

This application claims priority to U.S. Provisional Patent Application No. 62/693,554, filed on Jul. 3, 2018, and U.S. Provisional Patent Application No. 62/642,837, filed on Mar. 14, 2018, the contents of each are herein wholly incorporated by reference.

FIELD OF THE INVENTION

The invention relates to a system and associated fixtures and components for providing a ceiling mounted light box, including lighting fixtures that are large, uniform, free of hotspots, and relatively easy to install and maintain.

BACKGROUND

Stretch ceiling fabric installations have become popular architectural features in various architectural and retail indoor applications. One popular implementation has been to use stretch PVC and stretch it across the front of a lighting fixture, but that approach and related implementations present a number of challenges and issues, including lighting inefficiencies and difficulties in installing and maintaining the integrity of systems, particularly when maintaining the systems. Further, there is typically a need to hire special skilled labor to install such systems, particularly the fabric or stretchable faces associated with such an installation.

Further, even when properly installed, existing systems often have issues related to dust and bug intrusion. Such issues are exacerbated by poorly installed fabric or stretchable faces. Further issues, including electrical failures, may appear when electrical components are exposed to dust and bugs, as well as when the light fixture itself and a lighting compartment within the fixture are exposed to such elements. Electrical components can themselves fail in such embodiments, while dust and bugs may ultimately rest on the fabric or stretchable face of the fixture itself, and thereby may be visible during use of the lightbox.

Further, such systems must be engineered to specific sizes, and larger sizes are not feasible, and existing systems have wide returns bounding the light box, thereby resulting in a large visible border. Such a visible border interrupts the visual aesthetic of larger installations made from combining multiple smaller installations.

Accordingly, there is a need for a lighting fixture or lighting fixture system that can provide a large and uniform lighting surface that is free of hot spots, easy to install and maintain, and does not become easily corrupted with dust and bugs.

There is a further need for such a light box system intended to provide the look of a luminous finished surface and that allows for easy installation and easy maintenance, including installation of power supplies and electronics, and that provides easy access to electronics from a front face of the light fixture. There is a further need for a system that provides modular construction and allows for various configurations providing fixtures in different sizes.

SUMMARY

A lighting fixture is provided in which the fixture comprises a lighting surface, a lighting fixture frame adjacent an edge of the lighting surface, a sealable compartment within the lighting fixture frame, and a removable cover for sealing the sealable compartment.

The lighting fixture further comprises a diffusing surface parallel to and spaced apart from the lighting surface by the lighting fixture frame, where the sealable compartment is accessible through an opening between the lighting surface and the diffusing surface, and where the opening is covered by the removable cover.

The diffusing surface, lighting fixture frame, removable cover, and lighting surface combine to form a sealed lighting cavity independent of the sealable compartment.

The lighting surface may be, for example, an LED lighting surface containing a plurality of LEDs and, some embodiments, reflector surfaces. Such a lighting surface may be permanently fixed to the fixture frame, and the seable compartment may be sealed against the removable cover with a gasket.

The lighting fixture may be provided with a power source or control circuitry within the sealable compartment, and the circuitry or supply may be accessible by removing the cover. The sealable compartment may have a substantially consistent profile along at least one side of the lighting fixture, and the gasket may be provided along the length of the side of the lighting fixture.

The substantially consistent profile may include a hook for retaining a corresponding profile of the removable cover, and the cover may pivot relative to the hook. The removable cover may slope away from the lighting surface when sealing the sealable compartment. The removable cover may further be provided with a reflective outer surface.

The lighting fixture frame may have a substantially consistent cross profile provided along multiple sides of the lighting surface, forming a boundary of the fixture.

In some embodiments, the lighting fixture may be configured to mate with a neighboring identical lighting fixture, thereby forming a system comprising a plurality of lighting fixtures.

The sealable compartment may further comprise mounting locations for fixing the lighting fixture to a mounting element, such as a ceiling location.

In some embodiments, the lighting fixture may comprise a diffusing assembly comprising the diffusing surface and a diffusing frame for the diffusing surface, with the diffusing frame comprising the removable cover. The diffusing assembly may further comprise a second layer of material, where the diffusing surface is fixed at a first end of the diffusing frame and the second layer is fixed to the diffusing frame such that when the removable panel is installed, the second layer of material is adjacent the lighting surface and the diffusing frame, diffusing surface, and the second layer of material form a sealed diffusing chamber. The sealable compartment may then comprise the lighting fixture frame, the diffusing frame, and an edge of the lighting surface.

The diffusing frame may further comprise a light pipe extending to an edge or a corner of the diffusing frame. Similarly, the sealable compartment or the removable cover may further comprise a light pipe extending to an edge or a corner of the lighting fixture.

In some embodiments, the removable cover, when installed, forces the lighting surface against a component of the lighting fixture frame, thereby forming a seal.

In some embodiments, the removable cover, when installed, slopes away from the lighting surface when sealing the sealable compartment, thereby forming a return for the lighting fixture. In such an embodiment, the lighting fixture may further comprise a light pipe arranged such that light from the lighting surface illuminates a portion of the return adjacent the diffusing surface.

In some embodiments, the lighting fixture further comprises an opening in the lighting surface and an opening in the diffusing surface opposite the opening in the lighting surface, a sealed conduit connecting the opening in the lighting surface and the opening in the diffusing surface, and fixation points for at least one sprinkler, such that the at least one sprinkler may pass through the sealed conduit.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

A ceiling mounted light fixture, such as a fixture having a light box design, is provided with, in many embodiments, a removable stretch ceiling fabric or diffusing surface mounted opposite an LED lighting surface. Such a light fixture may be provided with returns configured to retain or maintain the diffusing surface opposite the lighting surface, and electronics may be provided in sealable compartments within the returns. The diffusing surface may be directly attached to the returns, or may be installed within a diffusing assembly including a diffusing frame which, in combination with a frame of the light fixture, forms a removable or hinged enclosure for easy installation and maintenance of the light fixture. Throughout this disclosure, diffusing surfaces are discussed, and it will be understood that such surfaces may be flexible fabric materials, such as a pliable or flexible translucent material, such as PVC, sail cloth, textiles, PET, and others.

Figure 1:
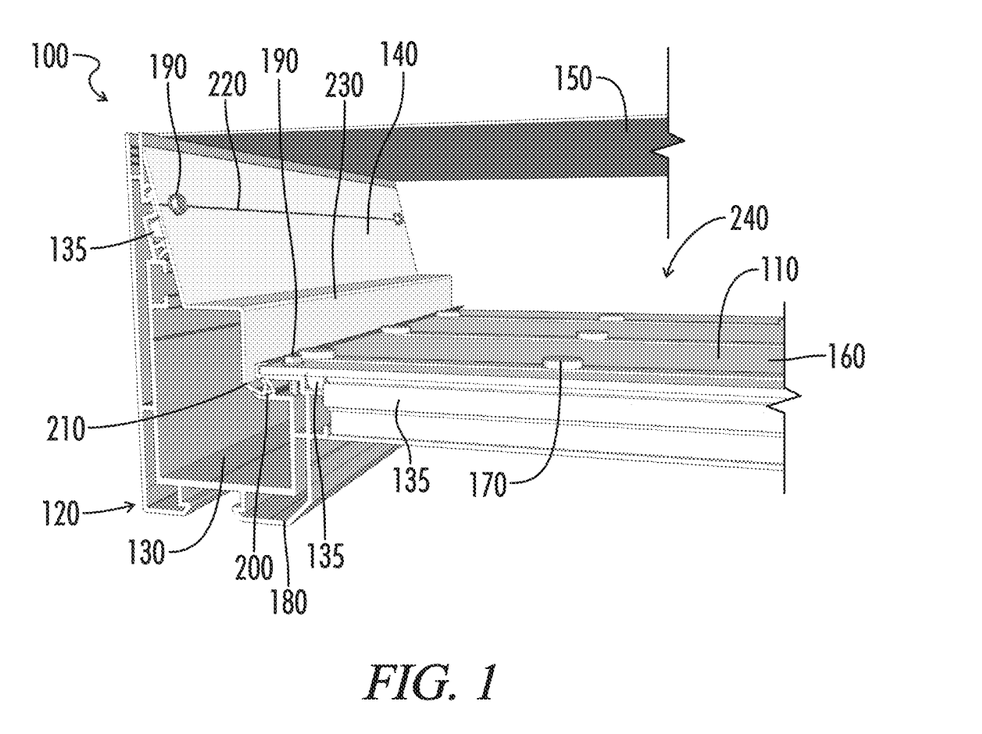
FIG. 1 shows a lighting fixture in accordance with this disclosure.
Figure 2:
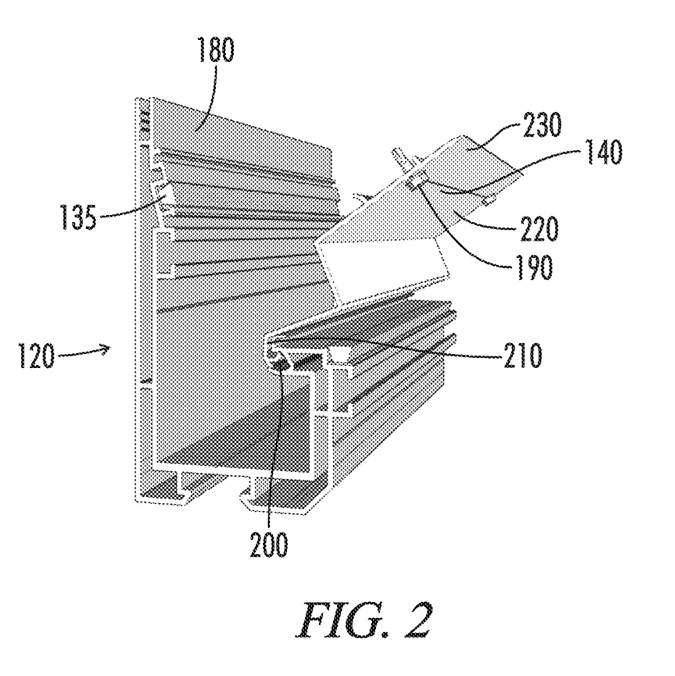
FIG. 2 shows features of the lighting fixture of FIG. 1.
Figure 3:
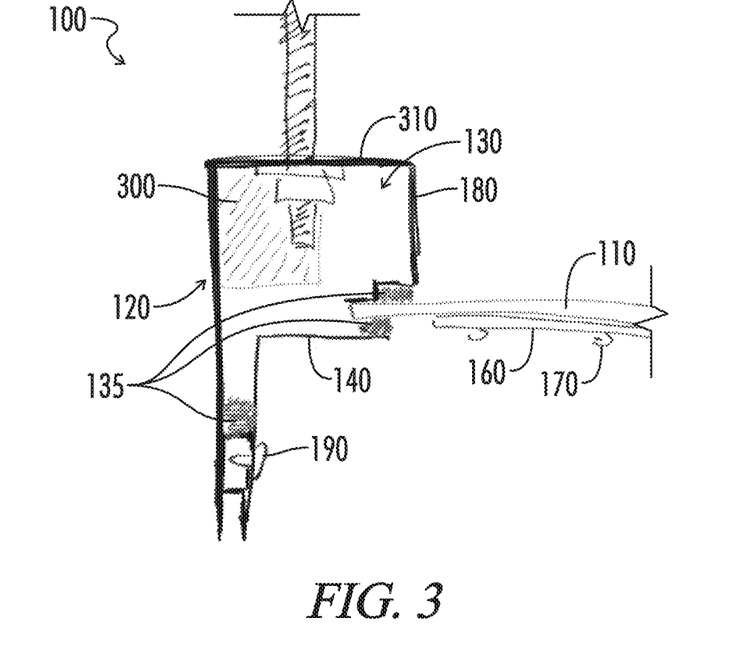
FIG. 3 shows a variation of the lighting fixture of FIG. 1.
Figure 4:
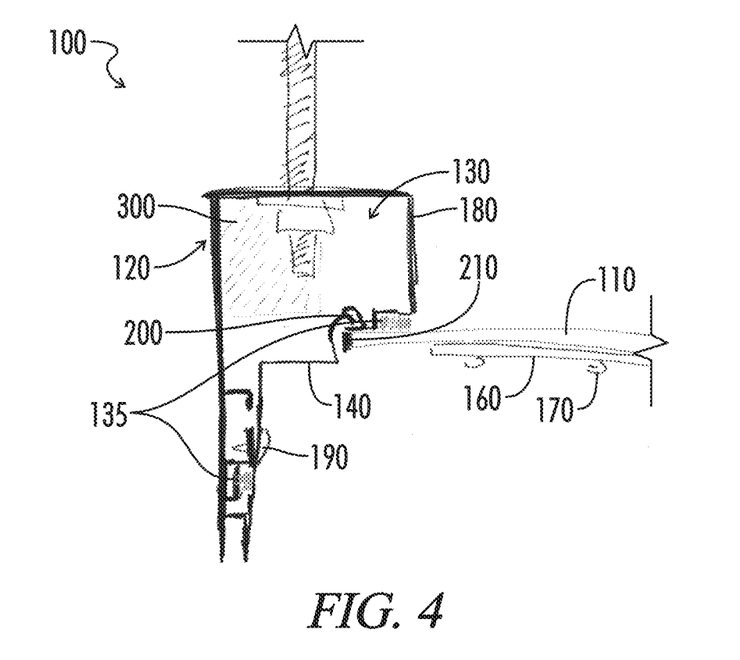
FIG. 4 shows a variation of the lighting fixture of FIG. 1.

FIG. 1 shows a lighting fixture 100 in accordance with this disclosure, and FIG. 2 shows features of the lighting fixture 100. FIGS. 3 and 4 show variations of the lighting fixture 100 of FIG. 1. As shown, the lighting fixture 100 has a lighting surface 110, a lighting fixture frame 120 adjacent an edge of the lighting surface, and a sealable compartment 130 within the lighting fixture frame. The sealable compartment 130 is sealed with a removable cover 140.

In discussing the sealable compartment 130 and other sealable or sealed components of the lighting fixture 100, it will be understood that the compartments are sealed with respect to dust and bugs, but are typically not air tight nor are all such embodiments completely dustproof. Referring to the sealable compartment 130, the term sealable indicates that mechanisms are provided for preventing dust from entering the compartment, such as gasket 135.

In the embodiment shown, the lighting surface 110 comprises a lighting-grade reflector surface 160, or other high performance light reflector surface, such as a 3 mm dibond with a top layer of high reflection film. The lighting surface 110 may then be a panel containing a plurality of Light Emitting Diodes (LEDs) 170 placed on the reflector surface 160. In some embodiments, the lighting surface 110 may be permanently fixed to the lighting fixture frame 120, such that it remains in place when the removable cover 140 is removed. In other embodiments, the lighting surface 110 may be fixed to the lighting fixture frame 120 using the removable cover 140, such that the fastening of the removable cover to the frame forces the lighting surface 110 against the frame.

Typically, a lighting fixture will contain a power supply 300 or other electronic components, not shown in FIGS. 1 and 2, but shown in the variations of FIGS. 3 and 4. In this disclosure, when referring to the power supply 300, it will be understood that relevant features may apply to other electronic components as well unless otherwise stated. Accordingly, such a power supply 300 is typically located within the sealable compartment 130. The power supply 300 is therefore accessible by removing the removable cover 140.

Typically, the lighting fixture frame 120 and the sealable compartment 130 contained in the frame have consistent, or substantially consistent, profiles 180 that extend along at least one side of the lighting fixture 100. Such a profile 180 may be an extruded shape, and it may be either entirely consistent, or it may be interrupted with support features, such as structural supports. Alternatively, the profile 180 may be interrupted with installation features, such as mounting locations 310 as shown in FIGS. 3 and 4. Such mounting locations 310 may be used to mount the lighting fixture 100 to an external lighting element, such as a ceiling location. Further, such a consistent profile 180 may be applied to multiple sides, or all sides, of the lighting fixture, such that the consistent profile of the lighting fixture frame forms a boundary of the lighting fixture 100.

In the context of such a consistent profile 180, the removable cover 140 may have a similarly consistent profile, and may be sealed against the profile 180 of the lighting fixture frame 120 using a gasket 135 that extends along the length of a side of the lighting fixture 100. Accordingly, the removable cover 130 may be pressed against the profile 180, and thereby against the gasket 135, using a fastening element or set of elements, such as screws 190. Accordingly, the removable cover 140 provides a gasket to enclose the sealable compartment 130 with a dust and bug resistant design.

The consistent profile 180 may include a hook section 200 or other fastening section for retaining the removable cover 140 at one end, and the removable cover may be provided with a corresponding section 210 for mating with the hook section. Accordingly, the removable cover 140 may be opened while remaining attached to the lighting fixture frame 120, or it may be fully removed and reinserted by hooking the corresponding section 210 to the hook section 200 and then rotating the removable cover to seal the sealable section 130, such that the removable cover pivots relative to the hook section.

The removable cover 140 may form a portion of, or the entirety of, or may enclose the entirety of, a return for the lighting fixture 100. Accordingly, the removable cover 140 may form a sidewall, or an angled sidewall, for a light box, or other lighting compartment, in which the lighting surface 110 is located. In such embodiments, the removable cover 140, or a portion 220 of the removable cover, when fixed to the lighting fixture frame 120, may slope away from the lighting surface 110. Further, as with the lighting surface 110 itself, the removable cover may have a reflective outer surface 230, such that the interior surfaces of the light box, namely surfaces of the removable cover and the lighting surface, are reflective. The removable cover 140 may then be used to cover any complex shapes in the return and act as an efficient light reflector. By providing a return with a smooth and reflective surface area free of ditches and channels that may entrap the lighting and produce inefficiencies. Further, the angled return may allow for lighting to be efficiently directed to the edges of the front lighted surface formed by a diffusing surface 150.

Accordingly, the lighting fixture 100 may also include a diffusing surface 150 parallel to and spaced apart from the lighting surface 110 by the lighting fixture frame 120, and the sealable compartment 130 is then accessible through an opening 160 located between the lighting surface 110 and the diffusing surface 150. The opening 160 is typically covered by the removable cover 140. The diffusing surface 150, when installed, may be a front cover of the lighting fixture 100 and may be used to complete a light box for the light fixture.

In such an embodiment, the light box section 240 of the lighting fixture 100 may itself be sealed, such that once assembled, the lighting fixture has a sealed compartment 130 for the power supply 310 and a sealed light box section 240 for the space between the lighting surface 110 and the diffusing surface 150. The sealed light box section 240 is then bounded by the lighting fixture frame 120, the lighting surface 110, and the removable cover 140.

In some embodiments, the lighting fixture 100 is gangable so that it can be connected electrically with a neighboring light fixture. This may be, for example, by providing matching holes, or matching locations at which holes can be placed, in the outside walls of the sealed compartments of adjacent lighting fixtures 100. Wires required for wiring adjacent lighting fixtures 100 may then be bolted together, and in some cases, sealed to each other, and electricals may then be channeled from box to box through the matching holes.

As such, electrical conduits, such as matching electrical holes or embedded wiring, may be provided for connecting adjacent fixtures. In this way modular base units may be provided to create light fixtures of arbitrary sizes. These base units may thereby provide for easy installation and easy maintenance. In some embodiments, a single diffusing surface 150 may be provided for covering multiple base units, thereby creating the appearance of a single undivided large area lighting fixture.

Figure 5:
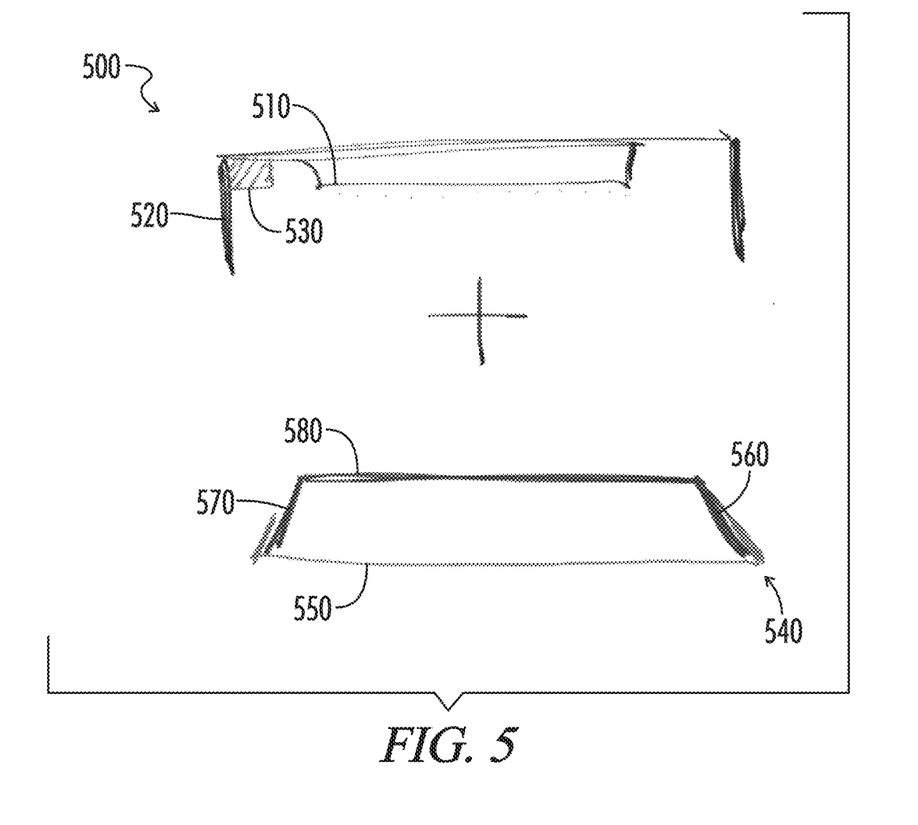
FIG. 5 shows an alternative embodiment of a lighting fixture in accordance with this disclosure.

FIGS. 5-10 show alternative embodiments of lighting fixtures provided in accordance with this disclosure. As shown in FIG. 5, a lighting fixture 500 is provided comprising a lighting surface 510, a lighting fixture frame 520, and a sealable compartment 530. A diffusing assembly 540 is provided comprising a diffusing surface 550 supported by a diffusing frame 560. The diffusing frame 560 includes angled surfaces 570 that removably cover and seal the sealable compartment 530. Accordingly, when the diffusing frame 560 is installed in the lighting fixture 500, the sealable compartment 530 containing the power supply 535 is formed from an interior surface of the lighting fixture frame 520 and the angled surfaces 570 of the diffusing frame 560. In some embodiments, the angled surfaces of the diffusing frame 560 may rest against the lighting surface itself 510, and the lighting surface may then be sealed or sealable with the light fixture frame 520, such that the sealable compartment 530 includes an edge of the lighting surface 510.

By providing a lighting fixture frame 520 that supports a diffusing assembly 540, such a structure allows electricians to install the lighting fixture 500 without fitting or removing the diffusing surface 550, thereby allowing for proper installation without the need for a specialist. Such an assembled diffusing assembly 540 also allows for a minimal frame bezel on the edges of the assembly for enhanced aesthetics. Such a lighting fixture 500, when properly installed, may prevent dust and bug penetration which would otherwise affect the look of the illuminated surface.

Further, for larger size lighting fixtures 500, the diffusing assembly 540 may be assembled onsite, and the diffusing surface 550, which may be a fabric, may then be installed more efficiently, and by less skilled labor, on the ground, rather than having an electrician attempt to apply a fabric diffusing surface directly to the lighting fixture frame 520. Such a diffusing assembly 540 may be detachable as one unit, or may be hinged outwards as a single unit, in order to provide access for initial assembly and for maintenance purposes.

The diffusing assembly 540 may, in some embodiments, be provided with a second layer of material 580. In such an embodiment, the diffusing surface 550 is then fixed at a first end of the diffusing frame 560 and the second layer of material 580 is fixed at or near a second end of the diffusing frame, such that when installed the second layer of material is adjacent the lighting surface. In such an embodiment, the diffusing assembly may comprise a sealed diffusing chamber 590 formed from the diffusing frame 560, the diffusing surface 550 and the second layer of material 580.

Figure 6A:
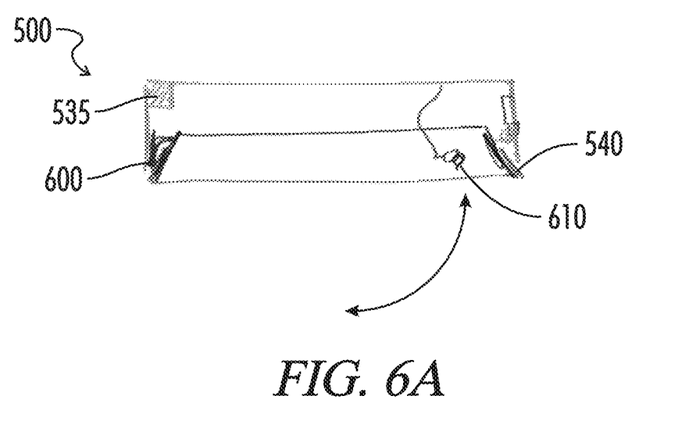
FIGS. 6A and 6B show an alternative embodiment of a lighting fixture in accordance with this disclosure in a first and second configuration respectively.
Figure 6B:
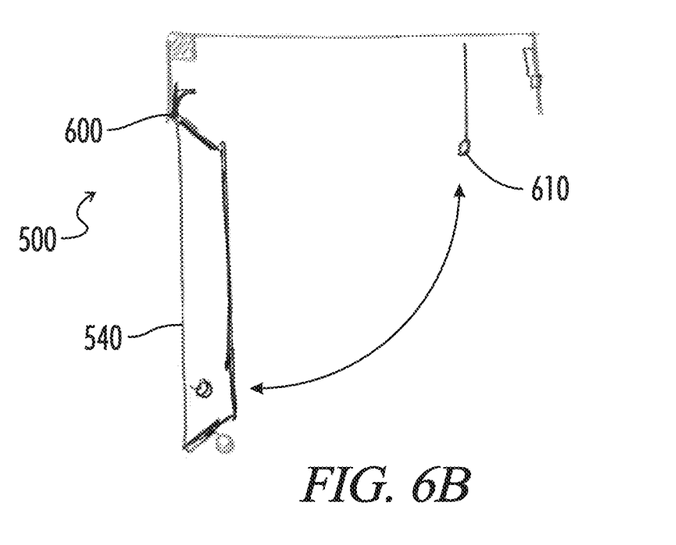
Figure 7A:
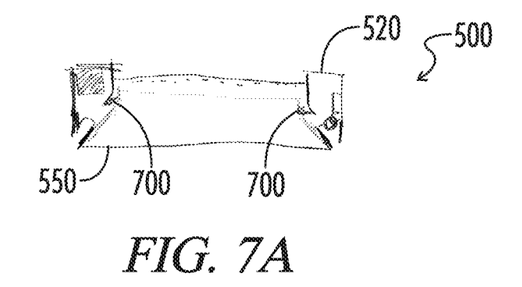
FIGS. 7A and 7B show an alternative embodiment of a lighting fixture in accordance with this disclosure in a first and second configuration respectively.
Figure 7B:
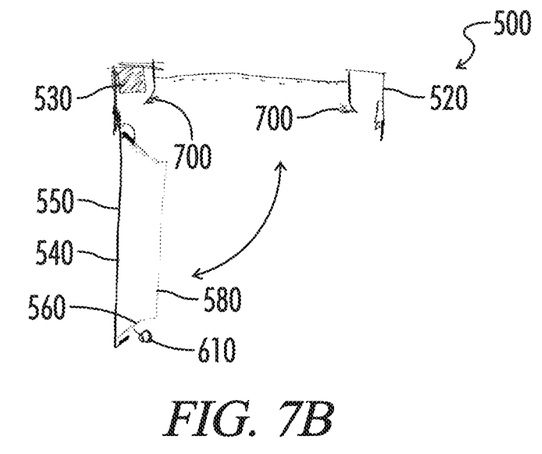

As shown in FIGS. 6A and 6B, and with additional detail in FIGS. 7A and 7B, in the context of a diffusing assembly 540, the diffusing frame 560 may be fixed to the sealable compartment 530 or the light fixture frame 520 at one side by a hinge 600. In such an embodiment, a fixation mechanism 610 may be provided at an opposite side of the diffusing frame 560. Such a fixation mechanism 610 may be, for example, a clam shell push-latch opening. The lighting fixture 500 may then be closed by pivoting the diffusing frame 560 about the hinge 600 and fastening the second end of the diffusing frame using the fixation mechanism 610. The fixation mechanism 610 may, in the alternative, comprise a hydraulic latch opening mechanism, such as those commonly used in attic entry hatches, or a push-release design that drops the diffusing assembly 540 down when actuated.

The angled surfaces 570 of the diffusing frame 560 may then form the sealable compartment 530 along with light fixture frame. As shown in FIG. 7, the various contact points may be provided with gaskets 700, such as pile gaskets, such that the fixation mechanism 610 can apply pressure to compress the gaskets between the diffusing frame 560 and the light fixture frame 520.

Further, as shown, the diffusing assembly 540 may be provided with a second layer of material 580. As such, the diffusing surface 550 would be visible when the lighting fixture 500 is in use, while the second layer of material 580 is transparent or translucent and provides a plenum layer for catching dust and bugs so that they cannot rest directly on the diffusing surface.

In embodiments where no such second layer of material 580 is provided, the top of the diffusing frame 560 may be gasketted against the light fixture frame 510 in order to seal the light box against dust and bugs.

Figure 8:
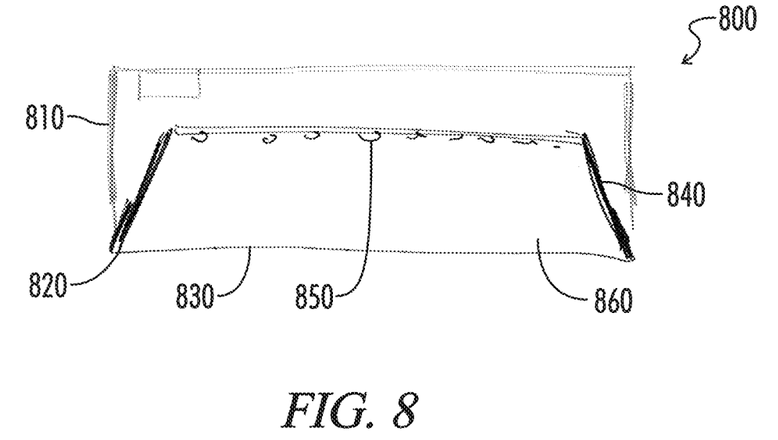
FIG. 8 shows an alternative embodiment of a lighting fixture in accordance with this disclosure.

As shown in FIG. 8, in some embodiments, a lighting fixture 800 may be provided with a light fixture frame 810 and a diffusing assembly 820, wherein the diffusing frame has a diffusing surface 830, a diffusing frame 840, and a lighting surface 850. In such an embodiment, the diffusing assembly 820 may form a sealed light box 860, bounded by the diffusing surface 830, diffusing frame 840, and lighting surface 850.

In this way, dust and bugs can be virtually eliminated from the sealed light box 860 forming the space between the lighting surface 850 and the diffusing surface 830. In the embodiment shown, the diffusing assembly 820 may contain a quick connect electrical connection such that it can be connected to the power and electronics box provided.

Figure 9A:
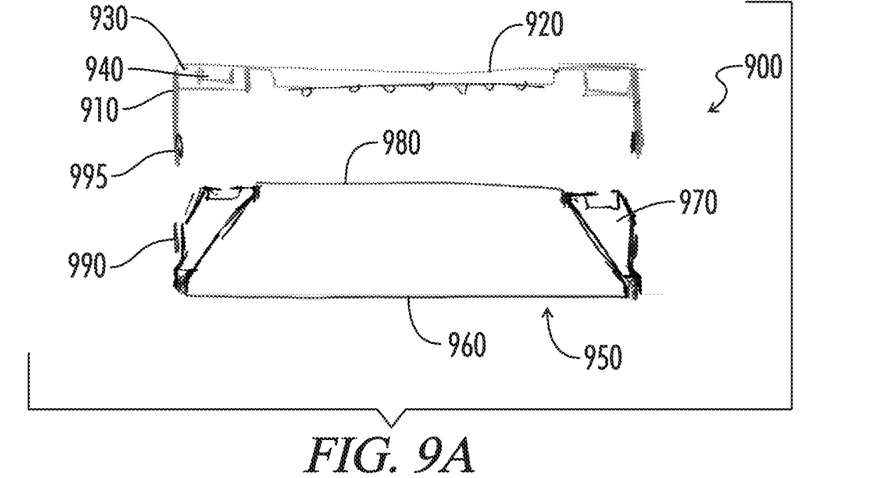
FIGS. 9A and 9B show an alternative embodiment of a lighting fixture in accordance with this disclosure in a first and second configuration respectively.
Figure 9B:
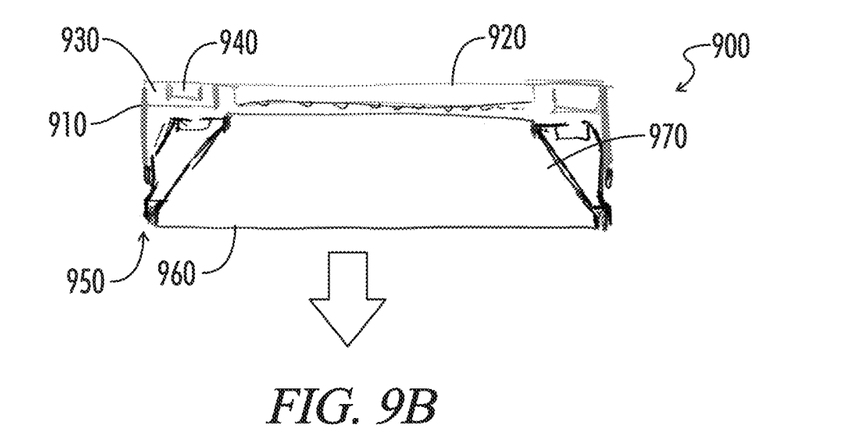

FIGS. 9A and 9B show an alternative embodiment of a lighting fixture in accordance with this disclosure in a first and second configuration respectively. As shown, the lighting fixture 900 has a light fixture frame 910, a lighting surface 920 mounted within the frame, and a compartment 930 containing a power supply 940. The lighting fixture 900 further comprises a diffusing assembly 950 which has a diffusing surface 960 a diffusing frame 970 and, in some embodiments, a second layer of material 980. As shown, the diffusing frame 970 may further comprise either a hinge or a detachable clip 990 for retaining the diffusing assembly 950 against the light fixture frame 910. Accordingly, the light fixture frame 910 may include a fixation point 995 for retaining the diffusing assembly 950.

As shown, the diffusion assembly 950 may be inserted into the light fixture frame and may form a sealed internal compartment containing the internal compartment 930 and the lighting surface 920. Alternatively, the internal compartment may remain unsealed and the power compartment 930 may itself be sealed. In embodiments where a second layer of material 980 is provided, the internal space of the diffusing assembly 950 may be sealed.

Figure 10:
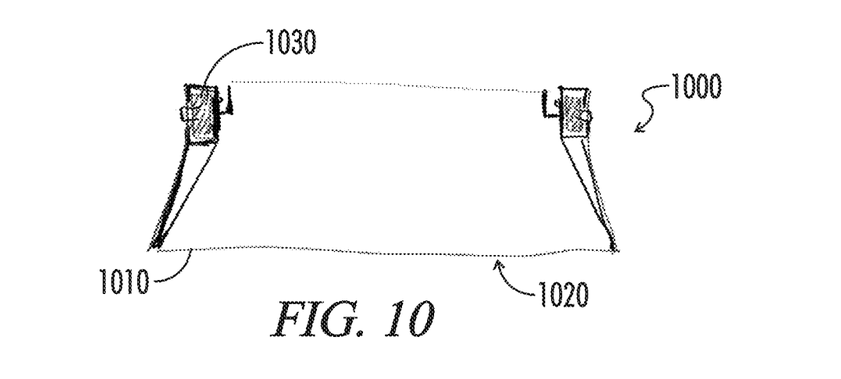
FIG. 10 shows an alternative embodiment of a diffusing assembly for use in lighting fixtures in accordance with this disclosure.

FIG. 10 shows an alternative embodiment of a diffusing assembly 1000 for use in lighting fixtures in accordance with this disclosure. The assembly shown can be incorporated into various embodiments of lighting fixtures discussed elsewhere in this disclosure. As shown, the assembly 1000 includes a diffusing surface 1010 made of a stretchable fabric and a diffusing frame 1020. The frame 1020 may be provided with fixation blocks 1030 for fixing the diffusing surface 1010 to outside surfaces of the frame 1020. As shown, the fabric of the diffusing surface 1010 is stretched around the diffusing frame and is then fixed to the fixation blocks 1030. This fixation may be, for example, by stapling the end of the fabric to the fixation blocks 1030. This approach allows for illumination of the diffusing surface 1010 to an edge of the diffusing frame 1020, thereby minimizing the seam between the light boxes for micro edge aesthetics. This approach also allows for working with certain fabrics to be used as diffusing surfaces 1010 that are otherwise difficult to install in the field.

Figure 11A:
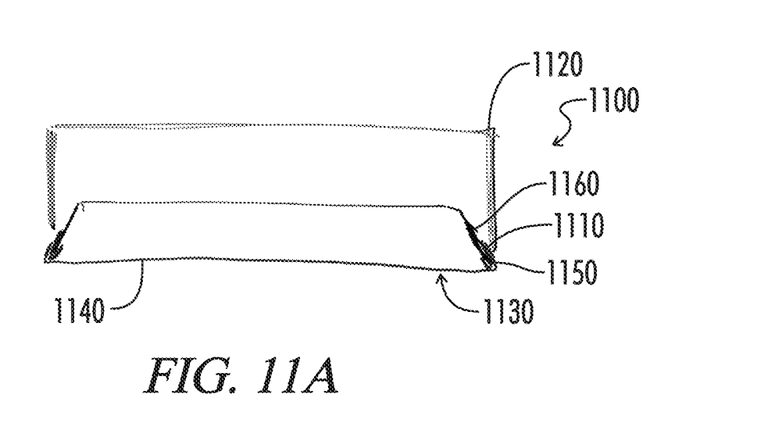
FIGS. 11*a* and 11B show a feature of some embodiments of lighting fixtures in accordance with this disclosure.
Figure 11B:
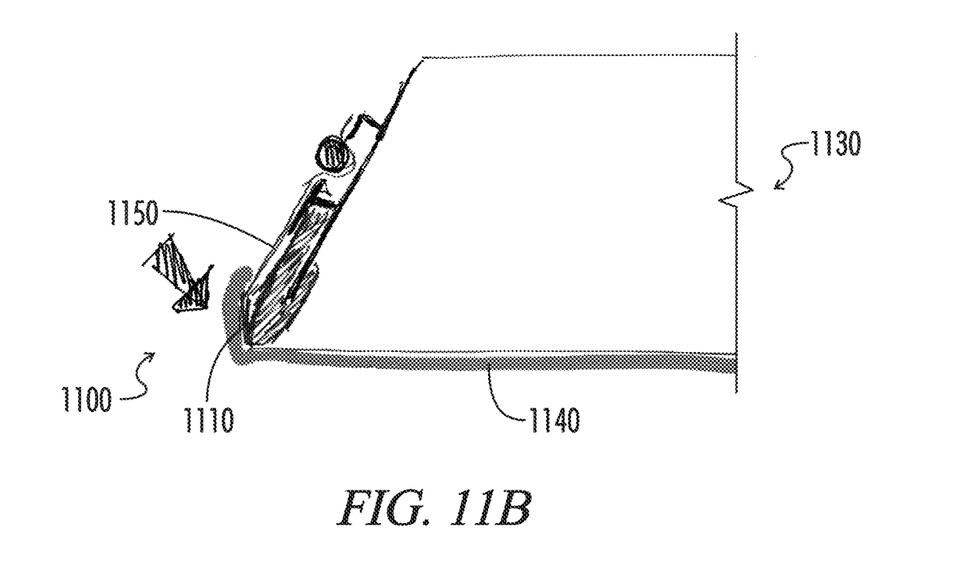
Figure 12:
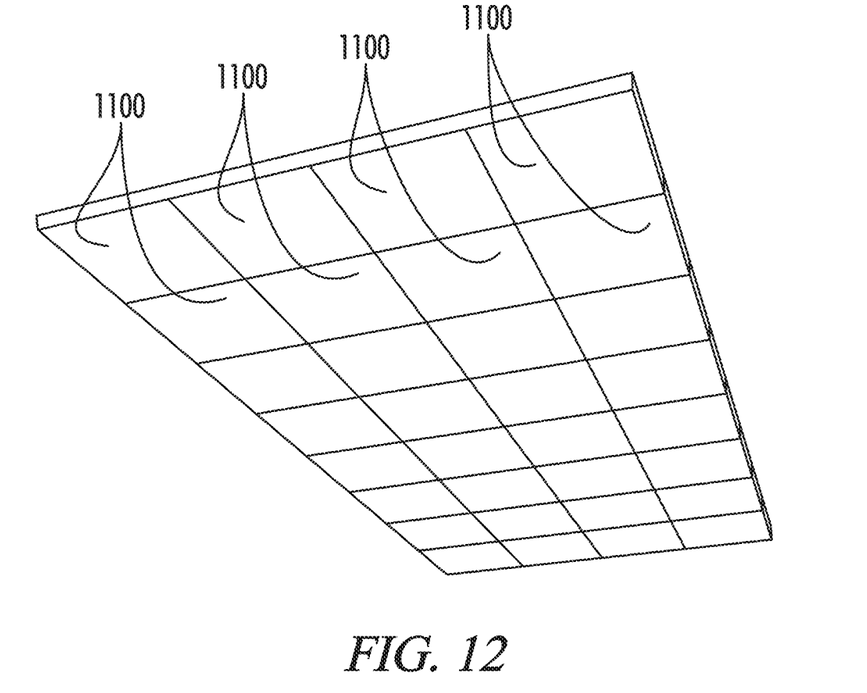
FIG. 12 shows a view of an installed set of lighting fixture in accordance with this disclosure.

FIGS. 11A and 11B show a feature of some embodiments of lighting fixtures in accordance with this disclosure. FIG. 12 shows multiple lighting fixtures installed adjacent each other and incorporating the feature shown in FIG. 11. As shown, a lighting fixture 1100 may be provided with a light transmissive component, referred to herein as a light pipe 1110, in order to direct light to corners of the fixture. It will be understood that when referencing a "light pipe," the element could be any light transmissive material arranged such that it transmits lights to the corners of the light fixture frame 11. Accordingly, the fixture 1100 may then comprise a light fixture frame 1120 containing a lighting surface and power supply (not shown) and a diffusing assembly 1130 having a diffusing surface 1140 and a diffusing frame 1150.

Typically, in lighting fixtures having frames, light is not spread into the outer edges of the frame, since the frame itself obstructs light. This is particularly problematic when lighting fixtures 1100 are installed adjacent each other, as it results in lights between the fixtures, and thereby results in interruptions in an otherwise flat and unified surface. As shown, a portion of each side wall 1160 of the diffusing frame 1150 may thereby be provided with, or comprise, a light pipe 1110. This will thereby direct light from the lighting surface to the edges of the individual lighting fixtures 1100 such that when the diffusing surface 1140 is applied to the diffusing frame 1150, the surface is lit to the outer edges.

By implementing a light pipe 1110 such as that shown, a light box may be illuminated not just to the edges, but also around the edges to the outside. Having such a fitted clear or translucent extruded material fitted into an extruded light fixture return and functioning as a light pipe may allow the light fixture to illuminate the front corners and sides of the return as well.

In such an embodiment, lighting fixtures 1100 installed adjacent each other, as shown in FIG. 12, may avoid a visible line between fixtures. A similar light pipe may be incorporated into different embodiments as well. For example, the light fixtures 100 shown in FIGS. 1-4 may be provided with light pipes installed at the outer edge of the light fixture frame 120 or on the cover 140, or on the return of a lighting fixture generally, thereby directing light to the corner of the surface. In such an embodiment, in addition to allowing a seamless combination of multiple complete fixtures, a single diffusing surface may be used to cover multiple fixtures, thereby providing a seamless diffusion surface across a larger light fixture.

The light pipe 1110 may similarly be an extrusion of a light transmissive material that mates with an extrusion made of a non-light transmissive material, such as aluminum, forming the remainder of the light fixture frame 1120.

Alternatively, the light transmissive component may be integrated into the lighting frame during assembly, or the entirety of the frame may be of a light transmissive material. If the entire frame is light transmissive, the back portion may be covered with a material, such as vinyl, preventive the exposure of the material to the light generated by the LEDs.

It will be understood that while the light pipe 1110 is shown in the context of the lighting assembly having a sealable compartment, the incorporating of such a light pipe into the frame of the lighting compartment as shown could be incorporated in different embodiments where no such sealable compartment is provided. Accordingly, such a light pipe 1110 implementation may be used whenever it is desirable for the lighting surface to extend to the edge of an assembly, such as when multiple fixtures are placed adjacent each other.

Figure 13:
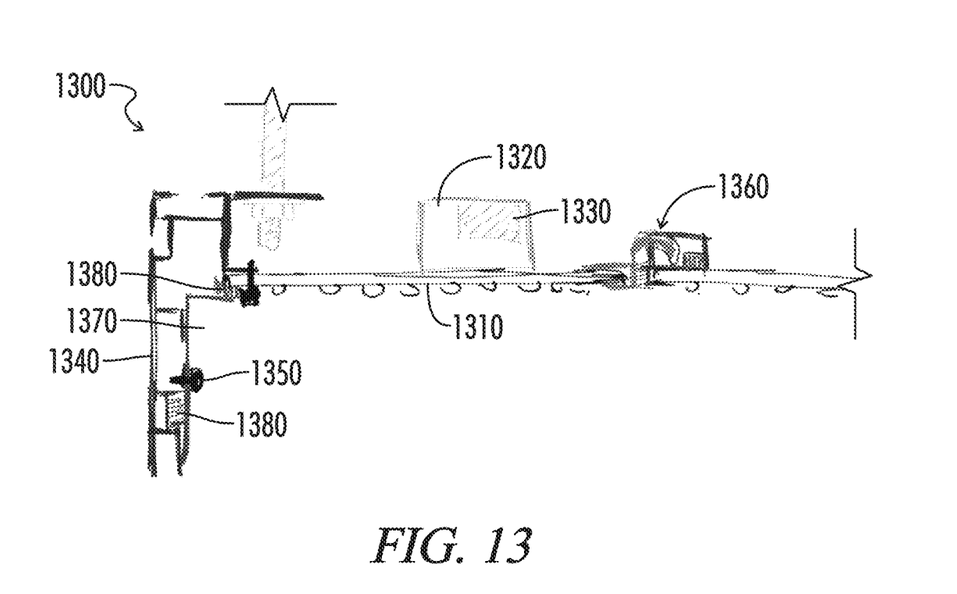
FIG. 13 shows an alternative embodiment of a lighting fixture in accordance with this disclosure.
Figure 14:
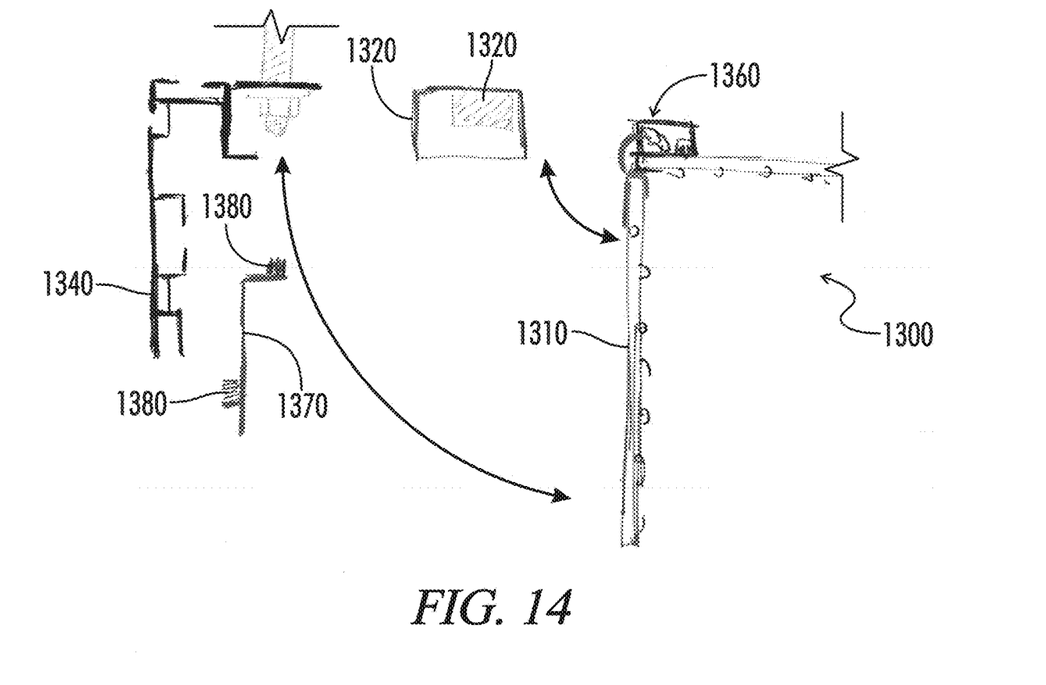
FIG. 14 shows the lighting fixture of FIG. 13 in an open configuration.
Figure 15:
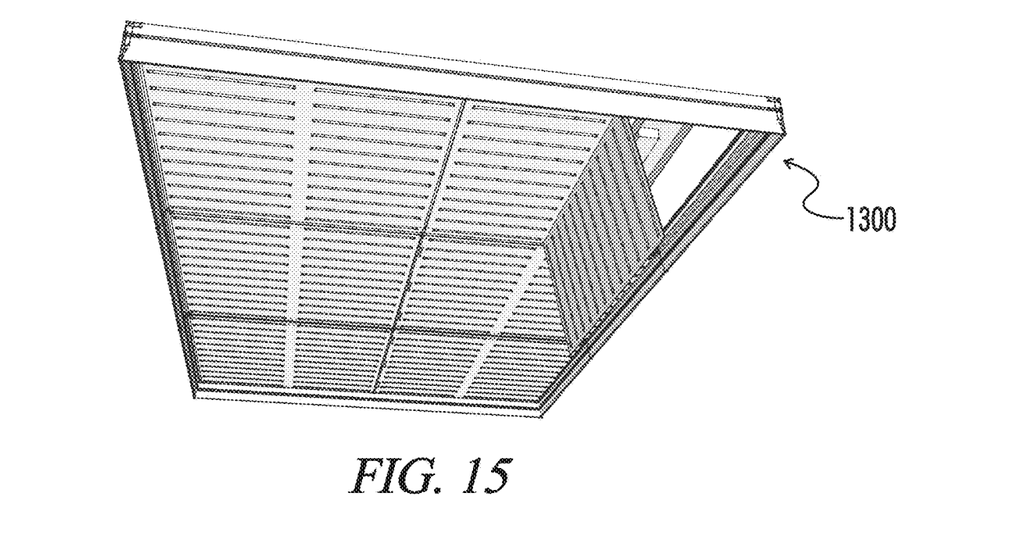
FIG. 15 shows a view of an installed version of the lighting fixture of FIG. 13.
Figure 16:
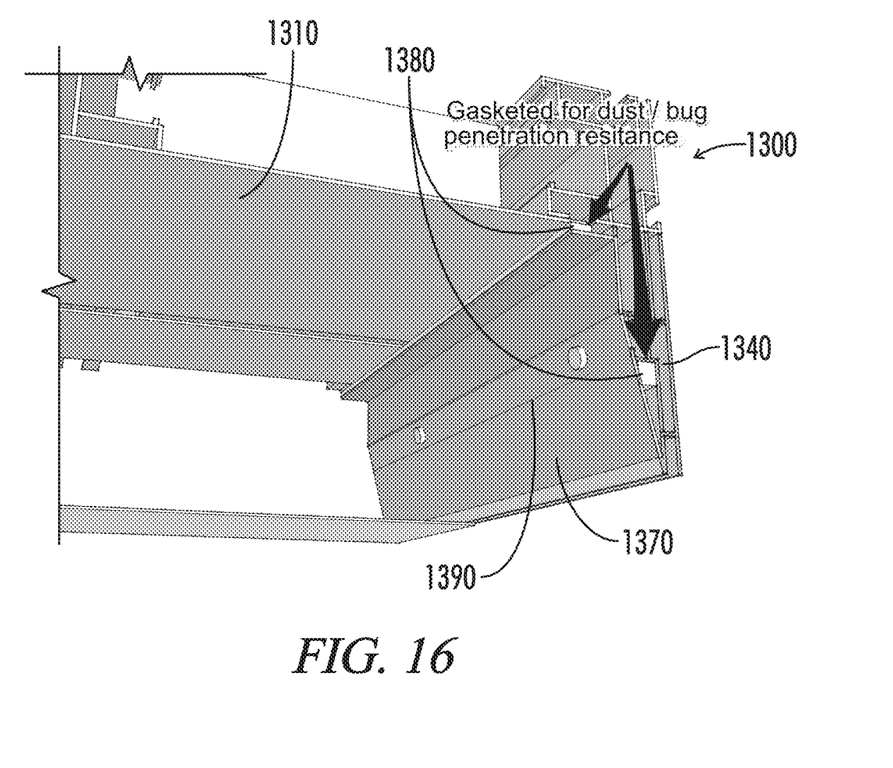
FIG. 16 shows a feature of a lighting fixture in accordance with this disclosure.

FIG. 13 shows an alternative embodiment of a lighting fixture 1300 in accordance with this disclosure. FIG. 14 shows the lighting fixture 1300 of FIG. 13 in an open configuration, and FIG. 15 shows a view of an installed version of the lighting fixture of FIG. 13. FIG. 16 shows a feature of a lighting fixture 1300 in accordance with this disclosure.

As in the embodiments described above, the embodiment of FIGS. 13-16 provide a complete ceiling mounted light box system that may provide the look of a luminous finished surface. A set of modular base units with an undivided diffusing surface may be provided, allowing for easy installation and maintenance while providing dust and bug resistant design. The designs described may allow for usage of non-lens LEDs for enhanced lighting efficiency, as well as use of RGB lighting, while providing easier access to mounting points while installing.

As shown, the lighting fixture 1300 comprises a lighting surface 1310, a sealable compartment 1320 adjacent the lighting surface, where the sealable compartment contains a power supply 1330, a lighting fixture frame 1340, and a sealing mechanism 1350 for sealing the lighting surface to the lighting fixture frame. As shown, the lighting surface 1310 may be attached to another segment of the lighting surface or a frame segment, with a hinge 1360 and the sealing mechanism 1350 may be a latch or a set screw for securing another edge of the lighting surface against the frame 1340.

As shown, the sealing mechanism 1350 may comprise a return portion 1370 of the lighting fixture frame 1340 containing gaskets 1380 for sealing the return portion 1370 against the lighting surface 1310. Accordingly, the return portion 1370 may be an angled return having a consistent cross section along a side of the lighting fixture 1300, such that when installed, it provides a gasket 1380 sealing the entire side of the lighting fixture frame against the lighting surface 1310. Multiple such gaskets 1380 may be provided in order to seal various compartments against the intrusion of bugs and dust. Further, the gasketed sealed compartments in the return portion 1370 may contain wiring that enters or leaves the assembly, and the return portion may have openings to an exterior of the assembly. Accordingly, if the assembly is electrically connected to an adjacent assembly, such connections would be sealed off from the light box section of the assembly.

As shown, when in the closed position, the sealing mechanism 1350 may compress the lighting surface 1310 against the sealable compartment 1320, which may itself be gasketed against the lighting surface. Accordingly, by releasing the sealing mechanism 1350, the lighting surface 1310 can be opened by pivoting about the hinge 1360, thereby providing access to the sealed compartment 1320.

As shown in FIG. 14, the hinge mechanism 1360 may allow the lighting surface 1310 to open downwards in order to provide access to the power supply 1330 in the sealable compartment 1320. Such a configuration eases the mounting and hanging of the fixture, as well as wiring of the fixture. Access to the sealable compartment 1320 as well as access to mounting hardware would be in the area accessible when the lighting surface 1310 is opened. As shown, the hinge mechanism 1360 itself may be sealed and gasketed such that the hinge does not allow dust or bugs into the lighting compartment.

The hinge 1360 mechanism may be provided in a variety of forms, including extruded aluminum joints, as shown in the figures, or as traditional hinge hardware, such as flush hinges or piano hinges, such as those used in doors or kitchen cabinets. Recessed hinges may be used to conceal the hinges. Such recessed hinge hardware may include euro type cabinet hinges or SOSS hidden door hinges. Hydraulic hinges or hydraulic assist mechanisms may be provided, such as attic hatch or basement hatch mechanisms.

The closure for such hinges may include set screws or latches, and the panel may be sealed with respect to dust and bugs once installed. In some embodiments, the lighting surface may be sealed directly, such that the hinge and latch or corresponding closure mechanisms are themselves sealed. In other embodiments, such as that shown in FIG. 16, the return portion 1370 of the lighting fixture frame 1340 is provided with gaskets 1380 that seal the lighting surface 1310 against the lighting fixture frame. Such a return portion 1370, when closed and engaged, may provide dust and bug resistance and may enclose the entirety of the light box of the lighting fixture 1300. It may also mechanically fix and seal the entire perimeter of the lighting surface 1310 in order to prevent it from opening unexpectedly. Finally, the return may be provided with a reflective surface 1390 in order to improve the lighting efficiency and even coverage of the lighting fixture 1300.

In the embodiment shown in FIG. 16, as well as the embodiments shown throughout, the angled return design may allow for lights, such as LEDs on the lighting surface 1310 to be installed very close to the returns in order to provide even illumination to the edge of the light fixtures.

Figure 17:
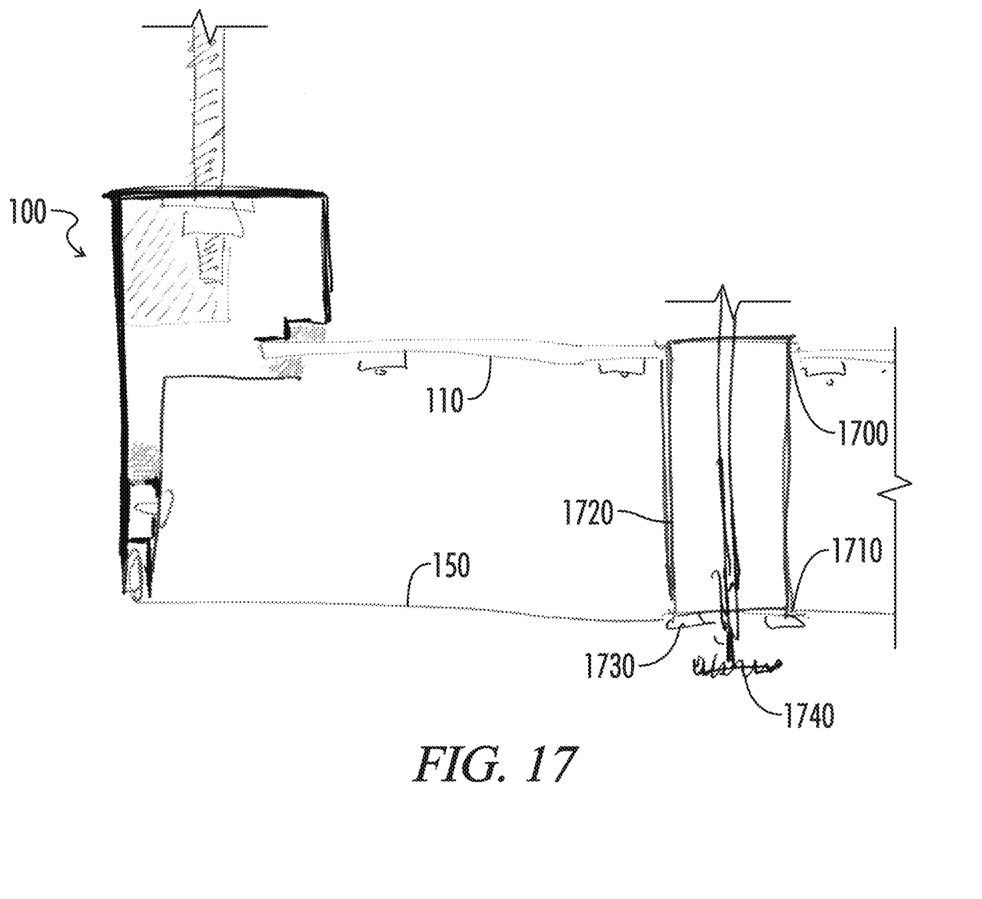
FIG. 17 shows a feature of a lighting fixture in accordance with this disclosure.

FIG. 17 shows a feature of a lighting fixture 100 in accordance with this disclosure. As shown, the lighting fixture 100 is adapted to incorporate a sprinkler system. Accordingly, the lighting surface 110 and the diffusing surface 150 each are provided with openings 1700, 1710, and the openings are positioned opposite each other. Between the two openings 1700, 1710 is a conduit 1720, such as a cylindrical passthrough, connecting the two openings. In some embodiments, such as where the light box portion of the lighting fixture 100 is generally sealed, the conduit 1720 may be sealed to both the lighting surface 110 and the diffusing surface 150 at their respective openings 1700, 1710. The conduit 1720 may be provided with a trim 1730 for connecting the conduit to one or both of the lighting surface 110 and the diffusing surface.

In embodiments where additional layers are provided, such as when a second layer of material is provided in a diffusion assembly, an additional opening may be provided in the second layer of material, such that a single conduit passes through the second layer of material and connects the diffusing surface and the lighting surface.

The conduit 1720 or the lighting fixture itself may then be provided with fixation points for a sprinkler 1740, or may be provided with components of a sprinkler system, such that the sprinkler can pass through the conduit and extend below the diffusing surface 150.

In this way, for a standard light box structure, the light box would have locations in which an appropriate conduit, such as a 3 inch cylindrical conduit, can be implemented. The mechanism would then allow for sealing the conduit at each end. This is more important as the light box covers larger amounts of area in the ceiling in intended applications. Similar pass-through configurations may be provided for other ceiling features that may otherwise interrupt a lighting system.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A lighting fixture comprising:
   a lighting surface;
   a lighting fixture frame adjacent an edge of the lighting surface and at least partially enclosing a lighting cavity;
   a sealable compartment within a structure of the lighting fixture frame; and
   a removable cover for the sealable compartment.

2. The lighting fixture of claim 1, further comprising a diffusing surface parallel to and spaced apart from the lighting surface by the lighting fixture frame, wherein the sealable compartment is accessible through an opening between the lighting surface and the diffusing surface, and wherein the opening is covered by the removable cover.

3. The lighting fixture of claim 2, wherein the diffusing surface, lighting fixture frame, removable cover, and lighting surface enclose and seal the lighting cavity independent of the sealable compartment.

4. The lighting fixture of claim 1, wherein the lighting surface is a panel containing a plurality of light emitting diodes (LEDs).

5. The lighting fixture of claim 4, wherein the lighting surface comprises reflector surfaces.

6. The lighting fixture of claim 1 further comprising a power source or control circuitry for the lighting surface within the sealable compartment, wherein the power source or control circuitry is accessible by removing the removable cover.

7. The lighting fixture of claim 6, wherein the lighting surface is permanently fixed to the fixture frame.

8. The lighting fixture of claim 7, wherein the sealable compartment is sealed against the removable cover with a gasket.

9. The lighting fixture of claim 8, wherein the sealable compartment has a substantially consistent profile along at least one side of the lighting fixture, and wherein the gasket is provided along the length of the side of the lighting fixture.

10. The lighting fixture of claim 9, wherein the substantially consistent profile includes a hook for retaining a corresponding profile of the removable cover, and wherein the removable cover pivots relative to the hook.

11. The lighting fixture of claim 9, wherein the removable cover slopes away from the lighting surface when sealing the sealable compartment.

12. The lighting fixture of claim 11, wherein the removable cover comprises a reflective outer surface.

13. The lighting fixture of claim 9, wherein the lighting fixture frame has a substantially consistent profile and is provided along multiple sides of the lighting surface, forming a boundary of the fixture.

14. The lighting fixture of claim 13 configured to mate with a neighboring identical lighting fixture, thereby forming a system comprising a plurality of lighting fixtures.

15. The lighting fixture of claim 1, wherein the sealable compartment further comprises mounting locations for fixing the lighting fixture to a mounting element.

16. The lighting fixture of claim 2 further comprising a diffusing assembly comprising the diffusing surface and a diffusing frame for the diffusing surface, the diffusing frame comprising the removable cover.

17. The lighting fixture of claim 16, the diffusing assembly further comprising a second layer of material, wherein the diffusing surface is fixed at a first end of the diffusing frame and the second layer of material is fixed to the diffusing frame such that, when the removable panel is installed, the second layer of material is adjacent the lighting surface, and wherein the diffusing frame, the diffusing surface, and the second layer of material form a sealed diffusing chamber.

18. The lighting fixture of claim 17, wherein the sealable compartment comprises the lighting fixture frame, the diffusing frame, and an edge of the lighting surface.

19. The lighting fixture of claim 16, wherein the diffusing frame further comprises a light pipe extending to an edge of the diffusing frame.

20. The lighting fixture of claim 1, wherein the sealable compartment or the removable cover further comprises a light pipe extending to an edge of the lighting fixture.

21. The lighting fixture of claim 2, wherein the removable cover, when installed, forces the lighting surface against a component of the lighting fixture frame.

22. The lighting fixture of claim 2, wherein the removable cover slopes away from the lighting surface when sealing the sealable compartment and forms a return for the lighting fixture.

23. The lighting fixture of claim 22 further comprising a light pipe, such that light from the lighting surface illuminates a portion of the return adjacent the diffusing surface.

24. The lighting fixture of claim 2 further comprising an opening in the lighting surface and an opening in the diffusing surface opposite the opening in the lighting surface, a sealed conduit connecting the opening in the lighting surface and the opening in the diffusing surface, and fixation points for at least one sprinkler, such that the at least one sprinkler may pass through the sealed conduit.

* * * * *